W. C. CODDINGTON.
Faucet.

No. 219,070. Patented Sept. 2, 1879.

Witnesses,
W. A. Bertram
D. L. H. Barclay

Inventor
W. C. Coddington
by
R. D. Williams.
Attorney.

UNITED STATES PATENT OFFICE.

WILLIAM C. CODDINGTON, OF BALTIMORE, MARYLAND.

IMPROVEMENT IN FAUCETS.

Specification forming part of Letters Patent No. 219,070, dated September 2, 1879; application filed July 8, 1879.

*To all whom it may concern:*

Be it known that I, W. C. CODDINGTON, of Baltimore city, State of Maryland, have invented certain new and useful Improvements in Faucets; and I hereby declare the same to be fully, clearly, and exactly described as follows, reference being had to the accompanying drawings, in which—

Figure 1:
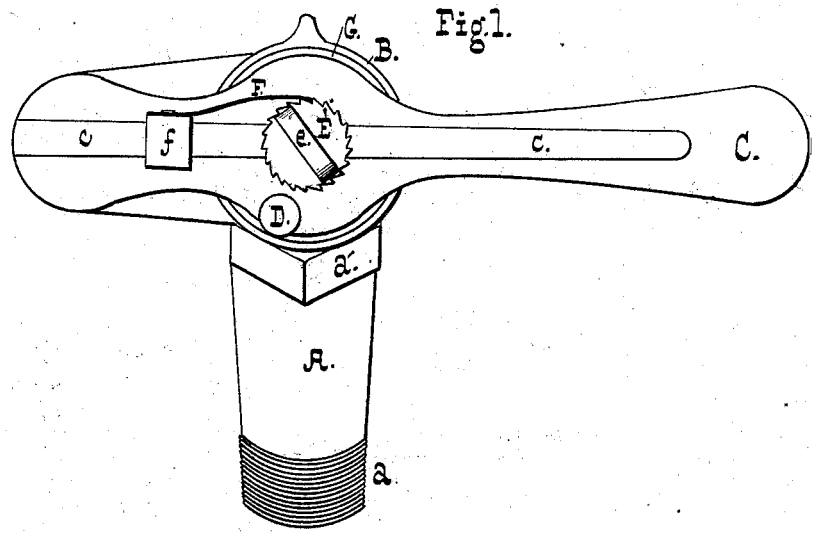
Figure 2:
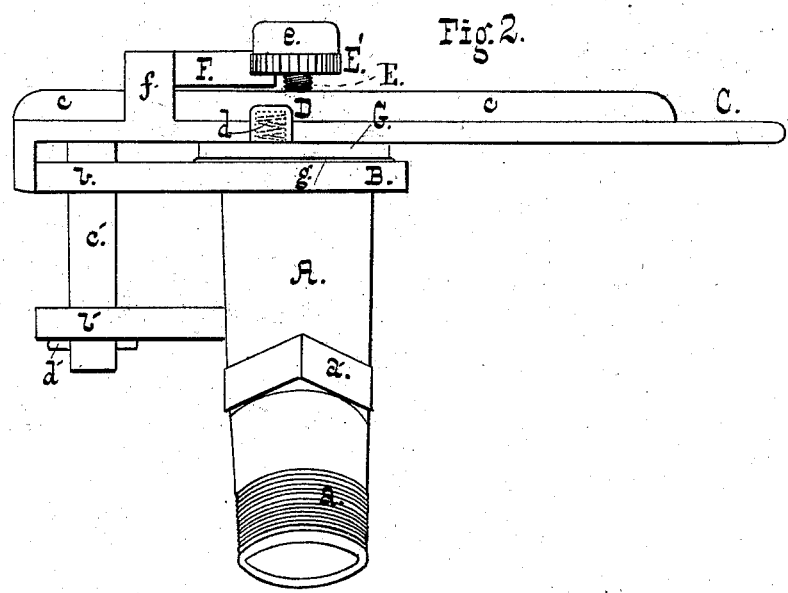

Figure 1 is a front elevation, and Fig. 2 a bottom plan, of the device.

My invention relates to that class of faucets in use for drawing molasses or similar viscid liquids from barrels; and consisting, essentially, of a tubular spout having a gate which is made to travel transversely over the end of the same.

My invention consists in such a faucet having certain devices for maintaining close contact of the gate with the spout end, and preventing the accidental loosening of the parts.

In the accompanying drawings, A is the spout, threaded at $a$, so that it may be screwed into a hole in the barrel, and provided with a polygonal shoulder, $a'$, for the attachment of a spanner or wrench. B is the end flange, in which is embedded a washer, $g$, of leather or equivalent material. Lugs $b\ b'$ are formed integral with the spout, and are perforated for the insertion of the pivot $c'$ of the handle C, which is secured by means of a pin, $d'$.

The handle C has a central rib, $c$, and an enlarged central portion where it comes opposite the orifice of the spout. In the under face of the handle is the gate G, consisting of a smooth-faced disk, which normally rests against the washer $g$.

A screw, E, passes through the handle C and presses upon the disk G, holding it closely against the washer. This screw is provided with a ratchet-head, $E'$, and lug $e$, by which it may be turned.

F is a spring, riveted to a lug, $f$, on the handle C, and adapted to engage with the ratchet $E'$ and prevent reverse rotation of the screw.

D is a casing integral with the handle, and containing a spiral spring, $d$, which serves to retain the lower edge of the disk G in close contact with the washer as the gate is lifted.

The operation of the device requires no description. It will have been made evident from the foregoing description of the construction of the parts.

In devices of this class, as heretofore constructed, various expedients have been resorted to to take up wear of the gate or washer as it occurs, and prevent incident leakage; but they have all been open to some objection, which it is the design of my invention to obviate.

The screw which has heretofore been employed for compressing the gate against the spout end would turn backward and allow the faucet to leak. To prevent this I provide the screw with mechanism for securing it against the possibility of accidental reverse rotation, consisting of the ratchet $E'$ and spring F. The latter is light enough to be readily retracted when it is desired to unscrew the parts for the purpose of renewing the washer, yet sufficiently stiff to properly hold the screw.

Having thus described my invention, what I claim as new, and desire to secure by Letters Patent, is—

1. A faucet consisting of a spout and end gate, provided with a suitable handle, and having its gate or disk retained by means of a ratcheted thumb-screw and spring, substantially as and for the purpose set forth.

2. In combination with the spout having threaded end $a$ and washer $g$, the handle C, pivoted to the spout and provided with the disk G, ratcheted thumb-screw, and spring F, substantially as set forth.

WILLIAM C. CODDINGTON.

Witnesses:
H. BAILEY,
R. D. WILLIAMS.